United States Patent Office 2,886,537
Patented May 12, 1959

2,886,537

OXIDATION-RESISTING MATERIAL

John Stephen Jackson, West Haddon, near Rugby, England, assignor to The British Thomson-Houston Company Limited, London, England, a British company No Drawing. Application February 27, 1956
Serial No. 567,722

Claims priority, application Great Britain
March 1, 1955

1 Claim. (Cl. 252—518)

This invention relates to a composite material possessing an ability to withstand relatively high temperatures without considerable oxidation.

According to the invention a composite oxidation-resistant material consists of a sintered mass of chromium monoboride and alumina.

It is well known that chromium monoboride and alumina both possess an ability to withstand oxidation at high temperatures. Whilst chromium monoboride has electrical resistivity of about 60 microhm-cm., alumina is an insulator, thus by varying the proportions of chromium monoboride and alumina, the electrical resistivity of the composite mass may be predetermined.

With a proportion of 40% alumina by weight, 60% by weight chromium monoboride, a value of resistivity of 420 microhm-cm. has been obtained.

In order to provide the sintered mass with the cohesion requisite for imparting the necessary mechanical properties to the sintered body, it is desirable first partially to oxidise the chromium monoboride. This may be effected by heating the chromium monoboride in air to a temperature of 1000° C., the powder being subsequently re-ground to enable the intimate mixture of the chromium monoboride and the powdered alumina to be obtained. The intimate mixture of the powdered constituents may be formed into a desired shape by pressing in a mould using a pressure of the order of 30,000 pounds per square inch, and after removal from the mould, the compacted mass is sintered by heating in air at a temperature of about 1750° C.

What I claim is:

A method of forming a composite oxidation-resistant electrical resistance body composed of chromium monoboride and alumina which consists in subjecting chromium monoboride to an oxidising process by heating in air to a temperature of about 1000° C., pulverising the resulting mass, intimately mixing powdered alumina with said powdered partially oxidised chromium monoboride, pressing said mixture into a desired form and heating to a temperature of about 1750° C. to sinter the pressed body into a coherent mass.

References Cited in the file of this patent

UNITED STATES PATENTS

| | | |
|---|---|---|
| 2,088,838 | Cole | Aug. 3, 1937 |
| 2,108,794 | Boyer | Feb. 22, 1938 |
| 2,201,151 | Boyer et al. | May 21, 1940 |

FOREIGN PATENTS

| | | |
|---|---|---|
| 565,866 | Great Britain | Dec. 1, 1944 |
| 691,368 | Great Britain | May 13, 1953 |
| 312,093 | Germany | Mar. 15, 1956 |